United States Patent [19]

Netzer

[11] Patent Number: 5,054,636

[45] Date of Patent: Oct. 8, 1991

[54] DRUM STORAGE SYSTEM UTILIZING DETACHABLE BLOCKS

[76] Inventor: Karl Netzer, Bahnhofstrasse 14, 6143 Lorsch, Fed. Rep. of Germany

[21] Appl. No.: 517,515

[22] Filed: Apr. 30, 1990

Related U.S. Application Data

[63] Continuation of Ser. No. 261,362, Oct. 24, 1988, abandoned.

[30] Foreign Application Priority Data

Oct. 23, 1987 [DE] Fed. Rep. of Germany ....... 3735876

[51] Int. Cl.⁵ .............................................. B65D 21/02
[52] U.S. Cl. .................................. 220/23.4; 206/504; 24/288; 24/456
[58] Field of Search ........................... 220/23.4, 23.6; 248/68.1; 24/287, 288, 336, 339, 531, 545, 456; 206/504

[56] References Cited

U.S. PATENT DOCUMENTS

| Re. 16,431 | 9/1926 | Kratzer | 220/23.4 X |
|---|---|---|---|
| 1,256,426 | 2/1918 | Baltzley | 24/456 |
| 1,800,109 | 4/1931 | Selig | 220/23.4 |
| 2,100,483 | 11/1937 | Jesser | 206/504 |
| 2,674,389 | 4/1954 | Baker et al. | 220/23.4 |
| 2,876,897 | 3/1959 | Taylor | 24/288 X |
| 3,134,485 | 5/1964 | Bonkowski et al. | 24/288 X |
| 3,250,564 | 5/1966 | Stern et al. | 24/288 X |
| 3,354,515 | 11/1967 | Robinson | 24/288 |
| 3,357,551 | 12/1967 | De Shazor, Jr. | 24/288 X |
| 3,480,136 | 11/1969 | Poupitch | 24/288 X |
| 4,120,396 | 10/1978 | Mascia et al. | 220/23.4 X |
| 4,227,759 | 10/1980 | Lee et al. | 24/339 X |
| 4,306,697 | 12/1981 | Mathews | 248/68.1 |
| 4,605,059 | 8/1986 | Page | 248/68.1 X |

FOREIGN PATENT DOCUMENTS

| 161109 | of 1929 | Australia | 24/545 |
|---|---|---|---|
| 2008143 | 9/1971 | Fed. Rep. of Germany | 220/23.4 |
| 975405 | 3/1951 | France | 24/339 |
| 1382492 | 11/1964 | France | 24/456 |
| 658571 | 10/1951 | United Kingdom | 24/287 |

Primary Examiner—James R. Brittain
Attorney, Agent, or Firm—Staas & Halsey

[57] ABSTRACT

A clamping device for detachably joining together drums to be stored one above the other and/or side by side is formed as a block-shaped clamping device consisting of flexible material and containing at least two open incisions. Preferably, the clamping is of approximately cubic shape and the open incisions respectively become wider as viewed toward the inside. The widened zones have preferably cross-section shaped like arcuate segments.

5 Claims, 3 Drawing Sheets 5,054,636

DRUM STORAGE SYSTEM UTILIZING DETACHABLE BLOCKS

This is a continuaton of copenidng application Ser. No. 07/261,362 filed on Oct. 24, 1988, now abandoned.

BACKGROUND OF THE INVENTION

Field of the Invention

The invention relates to a device for detachable binding together of drums to be stored one above the other and/or side by side.

The most diverse goods and products are stored and transported in drums. They can be, for example, not only liquids such as beverages, extracts, luxury substances, but also aggressive substances such as acids and lyes. Depending on the particular requirements, the drums are enamelled internally and/or externally; by analogy, the same is true for solid goods and products.

It has been found that the drums slip and strike each other during transport. Aside from the traffic-related danger concealed herein, the drums become dented, the enamelling consequently flakes off and the contents become contaminated. These disadvantages are not avoided even by interposing intermediate layers of covers or cardboard between the drums.

Furthermore, such drums normally have upper and lower beads, which do not permit stacking one above the other. Thus the loading surfaces of transport vehicles or even intermediate layers with pallets can be used only uneconomically.

From West German Laid-open Application 2,926,682 there is known a spacer device, which relates to a spacer strut for drums standing side by side and does not permit stacking one above the other.

West German Utility Model 78-06865 relates to a clamp for binding together of two containers placed one abovfe the other and does not represent anyy possibility of binding together of two containers disposed side by side.

SUMMARY OF THE INVENTION

The object of the invention is therefore to provide a device which ensures detachable binding together of the drums and keeps them spaced apart so that they cannot slip and strike each other and can be stacked one above the other and stored side by side.

This object is achieved according to the invention by providing that the clamping device for detachable binding together of drums is characterized in that the clamping device consisting of flexible material is formed as a block and contains at least two open incisions.

A particularly preferred embodiment is characterized in that the clamping device is of approximately cubic shape.

Another particularly preferred embodiment is characterized in that the open incisions respectively become wider as seen toward the inside, that the widened zones located internally in the incisions respectively have cross sections shaped like segments of a circle, and that two open incisions respectively are disposed side by side.

Another particularly preferred embodiment consists in providing that the incisions consist of bores.

Another particularly preferred embodiment is characterized in that the clamping devices consists of flexible plastic.

Another particularly preferred embodiment is characterized in that the device is provided at the bottom surface with a claw-type face. This clawing arrangement is suitable in particular as anchoring of the drums standing on pallets, by virtue of the dead weight on the pallet surface.

Another possible use of the clamping device provided with claw-type faces consists in providing that the clamping devices are mounted on the top rim of the drums, the claws then pointing upward and hereby a clawing arrangement being achieved with the pallet underside by virtue of the weight of the overlying pallets.

Another particularly preferred embodiment consists in providing that the device preferably has four through-bores provided with open incisions, the pairs of bores being disposed one above the other.

Another particularly preferred embodiment consists in providing that a preferably semicircular groove running parallel to each of the bores is disposed in the region of the wall at the height of the through-bores.

Another particularly preferred embodiment is characterized in that the through-bores and material grooves form flexible projections which permit a bead to be clipped in.

Another particularly preferred embodiment consists in providing that the middle projections are of pyramidal cross section.

Another particularly preferred embodiment is characterized in that the inside edges of the projections are of rounded shape.

Another particularly preferred embodiment consists in providing that bores are disposed to pass a bolt through and that the projections are provided with material incisions for introduction of a large screwdriver blade.

The invention is now explained in more detail by means of the attached drawings, which illustrate particularly preferred embodiments of the invention.

DETAILED DESCRIPTION OF THE REFERRED EMBODIMENTS

Figure 1:
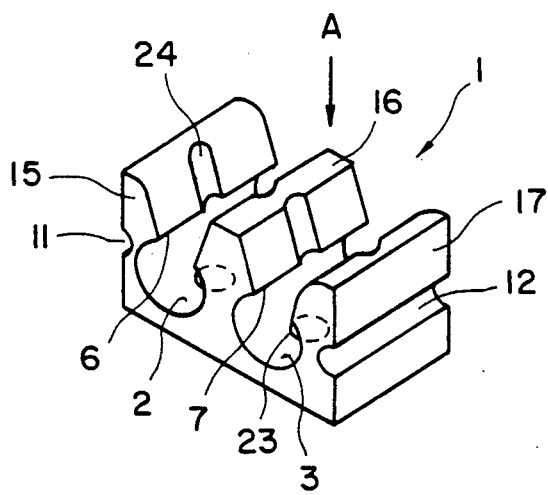
FIG. 1 shows the device according to the invention for binding together of preferably two drums standing side by side.

FIG. 1 shows a perspective diagram of the device 1 according to the invention. This practical example is used for binding together of drums disposed side by side on the base surface, i.e., where the drums sit on the vehicle floor or on a pallet.

Figure 5:
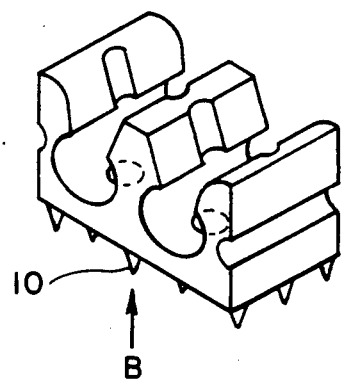
FIG. 5 shows the device according to the invention with claw-type face.
Figure 6:
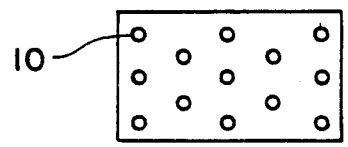
FIG. 6 shows a view of the claw-type face from the direction "B" indicated in FIG. 5.

In the region of the base surface, a particularly preferred practical example provides a claw-type face 10, as is illustrated in FIGS. 5 and 6. The body of approximately cubic shape is provided with two through-bores 2, 3, each of which is provided with an open incision 6, 47.

In region of the walls, a semicircular groove 11, 12 runs parallel to each of the bores 2, 3. The bores 2, 3 as well as the grooves 11, 12 together form a geometric, intentionally thinned section, so that flexible projections 15, 16, 17 which permit clipping into the beaded, circularly rounded drum rims are formed in the material. The thusly locked drums are held at a constant distance apart, so that they cannot strike each other.

For securing to the base surface or pallet, the clamping device according to the invention is provided with bores 23, through each of which a bolt can be passed.

In order also to permit engagement of large-bladed screwdrivers, the projections 15, 16, 17 are provided with material recessess 24.

Figure 1A:
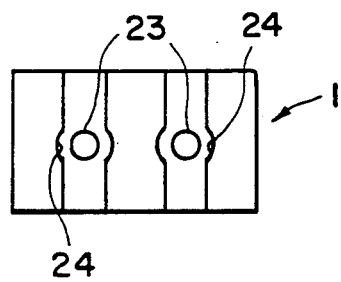
FIG. 1a shows a top view from the direction "A" indicated in FIG. 1.

FIG. 1a shows a top view from the direction "A" indicated in FIG. 1.

Figure 2:
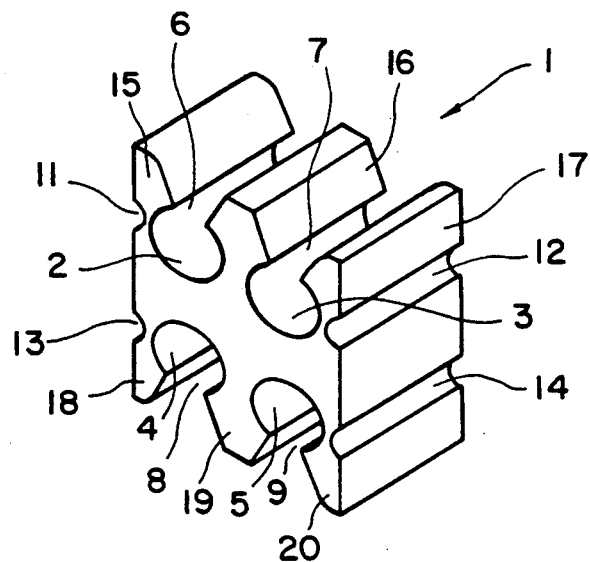
FIG. 2 shows the device for binding together of preferably drums standing side by side and one above the other.

FIG. 2 shows a perspective diagram of the invention, which permits the binding together of drums disposed side by side and one above the other.

The structural configurations are analogous to those already described in FIG. 1.

Figure 3:
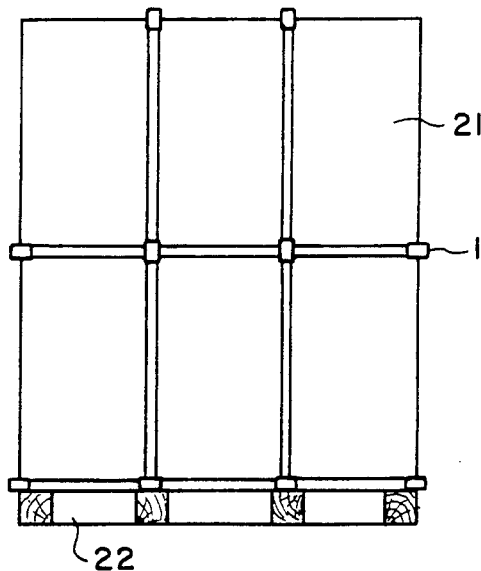
FIG. 3 shows the schematic diagram of bound-together combination.
Figure 4:
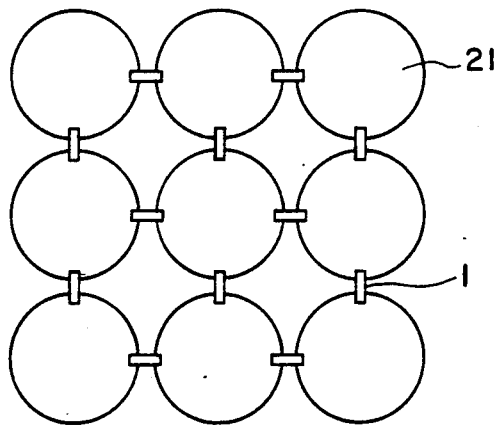
FIG. 4 shows a top view of FIG. 3.

FIGS. 3 and 4 schematically show a bound-together combination of drums 21, achieved by the device 1 according to the invention. It is clear here that this combination can be enlarged as desired, depending on the space availability in the transport vehicle.

In the area in which drums are stored side by side and one above the other, the devices illustrated in FIG. 2 are preferably used.

The invention represents a device which permits stacking of drums side by side and one above the other in a manner optimum from the viewpoints of both storage and transport technology, and which is reusable because of its detachability from the drums.

I claim:

1. A drum storgage system comprising:
   a plurality of drums of substantially equal diameter and height, each drum having an upper rim and a lower rim, the drums being arranged in a plurality of rows and columns and having an uppermost set and lowermost set of drums so that for each two adjacent drums of a row the lower rims of the two adjacent drums are juxtaposed each other and the upper rims of the two adjacent drums are juxtaposed each other, and for each two adjacent drums of each column the lower rim of one drum overlies the upper rim of another, adjacent drum;
   a plurality of first blocks, each first block having a body made of flexible material and having a first set of three projections on one side which forms a first set of two clips and a second set of three projections on an opposite side which forms a second set of two clips, one first block being provided at each pair of juxtaposed upper rims and each pair of juxtaposed lower rims to clamp together the juxtaposed lower rims and the juxtaposed upper rims of the adjacent drums of each row, and the coresponding lower rim of a drum in one column with the corresponding upper rim in the same column, and
   a plurality of second blocks, each second block consisting of a base and a first set of three projections on one side which forms a first set of two clips, one second block being provided at each pair of juxtaposed lower rims of the lowermost set of drums to clamp together adjacent lower rims of the lowermost set of drums and at each pair of juxtaposed upper rims of the adjacent drums of the uppermost set of drums to clamp together adjacent upper rims of the uppermost set of drums.

2. A clamping deivce according to claim 1 wherein the body has first and second bores, each having an incision extending outwardly from the respective bores to form the three projections of the first set.

3. A clamping device according to claim 2, further comprising slots formed along sides of the first set of two clips of the second blocks to permit insertion of a prying tool.

4. A clamping device according to claim 1, wherein the base of the second blocks used to clamp the juxtaposed lower rims of the drums of the lowermost set of drums includes a plurality of claws to prevent sliding.

5. A clamping device according to claim 1, wherein the base of each second block used to clamp the juxtaposed lower rims of the drums of the lowermost set of drums includes mounting holes for attaching the block to a stationary structure.

* * * * *